UNITED STATES PATENT OFFICE.

DAVID GIROUARD, OF LEOMINSTER, MASSACHUSETTS.

MIXTURE FOR MAKING BREAD AND PASTRY AND PROCESS OF MAKING THE SAME.

1,152,087.    Specification of Letters Patent.    Patented Aug. 31, 1915.

No Drawing.    Application filed March 28, 1914. Serial No. 828,077.

*To all whom it may concern:*

Be it known that I, DAVID GIROUARD, a citizen of the United States, residing at Leominster, in the county of Worcester and State of Massachusetts, have invented certain new and useful Improvements in Mixtures for Making Bread and Pastry and Processes of Making the Same, of which the following is a specification.

My invention relates to food and more particularly to bread and pastry, and especially to the dough and the process of making the same, and has for its special object the economizing of milk and shortening, and of eggs used in making pastry dough.

In the practice of my invention I employ desiccated milk known as milk-flour and sometimes called powdered milk, water, and flour, and I compound them in the following manner and proportions: I first mix one quart of lukewarm water with eight ounces of milk-flour and stir the mixture thoroughly and then allow it to stand for three or four hours. I then whip it into a stiff frosting. I then place in one end of a suitable mixing trough four-fifths of a barrel of flour and into the other end of the trough I pour approximately four ordinary pails of water, which may be either hot or cold, and add yeast sufficient for ordinarily making four-fifths of a barrel of flour into bread. The water will back up to the flour, and I then draw some of the flour onto the top of the water and then sprinkle some of the mixture of water and desiccated milk or milk-flour, previously prepared as above, onto the top of the flour, and I continue this drawing of the flour over the water and sprinkling of said mixture on top of it until all of the mixture has been thus added to the flour, taking strict care throughout the process not to have the mixture touch the water in the trough for the reason that if the mixture came in direct contact with the water the water would dissolve the mixture and the benefit of the process would be lost. After the flour, with the mixture sprinkled through it, and the water have become blended the mass is thoroughly kneaded until it becomes a dough when it is ready to be divided into loaves or pastry, as may be desired, for baking.

It will be observed that the process and the relative quantities of the ingredients are the same whether the dough is to be used for bread or pastry, and that in the case of bread there is a great saving as to milk and shortening, and in the case of pastry, that as the mixture made of one quart of water and eight ounces of desiccated milk or milk-flour is equivalent to twenty eggs and is a substitute for the eggs, eggs are entirely dispensed with by my process. It will also be apparent that the quantity of dough whether for making bread or pastry can be enlarged or made smaller than the quantity specified by simply increasing or decreasing the quantities of the ingredients keeping up their relative proportions, and inasmuch as one pint of my mixture of water and desiccated milk or milk-flour is equivalent to the use of ten eggs the quantity of dough desired for pastry may be determined where it is known how many eggs in the ordinary process of making pastry would be required to make the desired quantity of dough.

Having thus described my invention what I claim is:

1. A dough for bread and pastry comprising a frosting composed of one quart of lukewarm water and eight ounces of desiccated milk thoroughly whipped together, mixed with four-fifths of a barrel of wheat flour, four pails of water, and yeast.

2. A dough for bread and pastry comprising a frosting composed of one quart of lukewarm water and eight ounces of desiccated milk, thoroughly whipped together, mixed with wheat flour, water, and yeast substantially as and in the proportions set out.

3. The process for making a dough for bread or pastry consisting in mixing with approximately four-fifths of a barrel of flour, approximately four pails of water, and yeast, a mixture of approximately one quart of water, and approximately eight ounces of desiccated or powdered milk, which has been whipped into a stiff frosting.

4. The process of making a bread or pastry dough consisting in mixing one quart of water mixed with eight ounces of desiccated milk, with four-fifths of a barrel of flour, four pails of water and yeast; the flour being deposited in one end of the kneading trough, the water in the other end, and the flour drawn over the water, and the mixture of water and desiccated milk distributed over the flour so drawn, alternately, until said mixture has become exhausted and forms with the flour above the water alternate layers of flour and said mixture, and the whole then kneaded until it becomes a dough.

In testimony whereof I hereto affix my signature in the presence of two witnesses.

DAVID GIROUARD.

Witnesses:
 AMORE B. LEGERE,
 ALEXANDER SNOW.

Copies of this patent may be obtained for five cents each, by addressing the "Commissioner of Patents, Washington, D. C."